United States Patent
Nordback

(10) Patent No.: US 9,791,971 B2
(45) Date of Patent: Oct. 17, 2017

(54) REGISTRATION OF ELECTRONIC DISPLAYS

(71) Applicant: Konica Minolta Laboratory U.S.A., Inc., San Mateo, CA (US)

(72) Inventor: Kurt N. Nordback, Portland, OR (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/609,255

(22) Filed: Jan. 29, 2015

(65) Prior Publication Data
US 2016/0224184 A1    Aug. 4, 2016

(51) Int. Cl.
*G06F 3/041*    (2006.01)
*G06F 3/0488*    (2013.01)
(Continued)

(52) U.S. Cl.
CPC .......... *G06F 3/0418* (2013.01); *G06F 3/0488* (2013.01); *G06F 3/1462* (2013.01); *G09G 5/001* (2013.01); *G09G 5/12* (2013.01); *G06F 3/1446* (2013.01); *G09G 2300/026* (2013.01); *G09G 2354/00* (2013.01); *G09G 2360/04* (2013.01)

(58) Field of Classification Search
CPC ........ G09G 2356/00; G09G 5/14; G09G 5/12; G09G 2300/026; G06F 3/1423; G06F 3/1446; G06F 3/1431; G06F 3/1438; G06F 1/1647; G06F 1/1649; G06F 3/0412; G06F 2200/1635; H04N 21/4316;
(Continued)

(56) References Cited

U.S. PATENT DOCUMENTS

| | | | |
|---|---|---|---|
| 6,331,840 B1 | 12/2001 | Nielson et al. | |
| 2010/0225664 A1 | 9/2010 | Ogasawara | |
| 2013/0176255 A1* | 7/2013 | Kim ...................... | G06F 3/1423 345/173 |

FOREIGN PATENT DOCUMENTS

JP    2002-006822 A    1/2002
WO    2014/097505 A1    6/2014

OTHER PUBLICATIONS

Office Action in corresponding Japanese Application No. 2016-012899 dated Feb. 21, 2017, with English translation (8 pages).
(Continued)

*Primary Examiner* — Grant Sitta
*Assistant Examiner* — Amen Bogale
(74) *Attorney, Agent, or Firm* — Osha Liang LLP

(57) ABSTRACT

A method for operating computing devices (CDs) to display an electronic document (ED), including: obtaining, by a first CD having a first touchscreen, a first plurality of screen coordinates associated with a first portion of a first gesture performed by a user; obtaining, by the first CD and from a second CD having a second touchscreen, a second plurality of screen coordinates associated with a second portion of the first gesture performed by the user; determining, by the first CD and based on the first plurality of screen coordinates and the second plurality of screen coordinates, an alignment of the first touchscreen and the second touchscreen; and displaying, by the first CD and based on the alignment, a first segment of the ED on the first touchscreen, where the second CD displays a second segment of the ED on the second touchscreen while the first segment is displayed.

14 Claims, 10 Drawing Sheets

(51) Int. Cl.
*G09G 5/00* (2006.01)
*G09G 5/12* (2006.01)
*G06F 3/14* (2006.01)

(58) Field of Classification Search
CPC ........ H04N 21/4122; H04N 21/41407; H04M 2250/16; H04H 20/57
See application file for complete search history.

(56) References Cited

OTHER PUBLICATIONS

"Junkyard-Jumbotron," c4fcm.github.io/Junkyard-Jumbotron, Retrieved on Jan. 26, 2015.
Office Action in corresponding Japanese Application No. 2016-012899 dated Jun. 20, 2017, with English translation (8 pages).

* cited by examiner

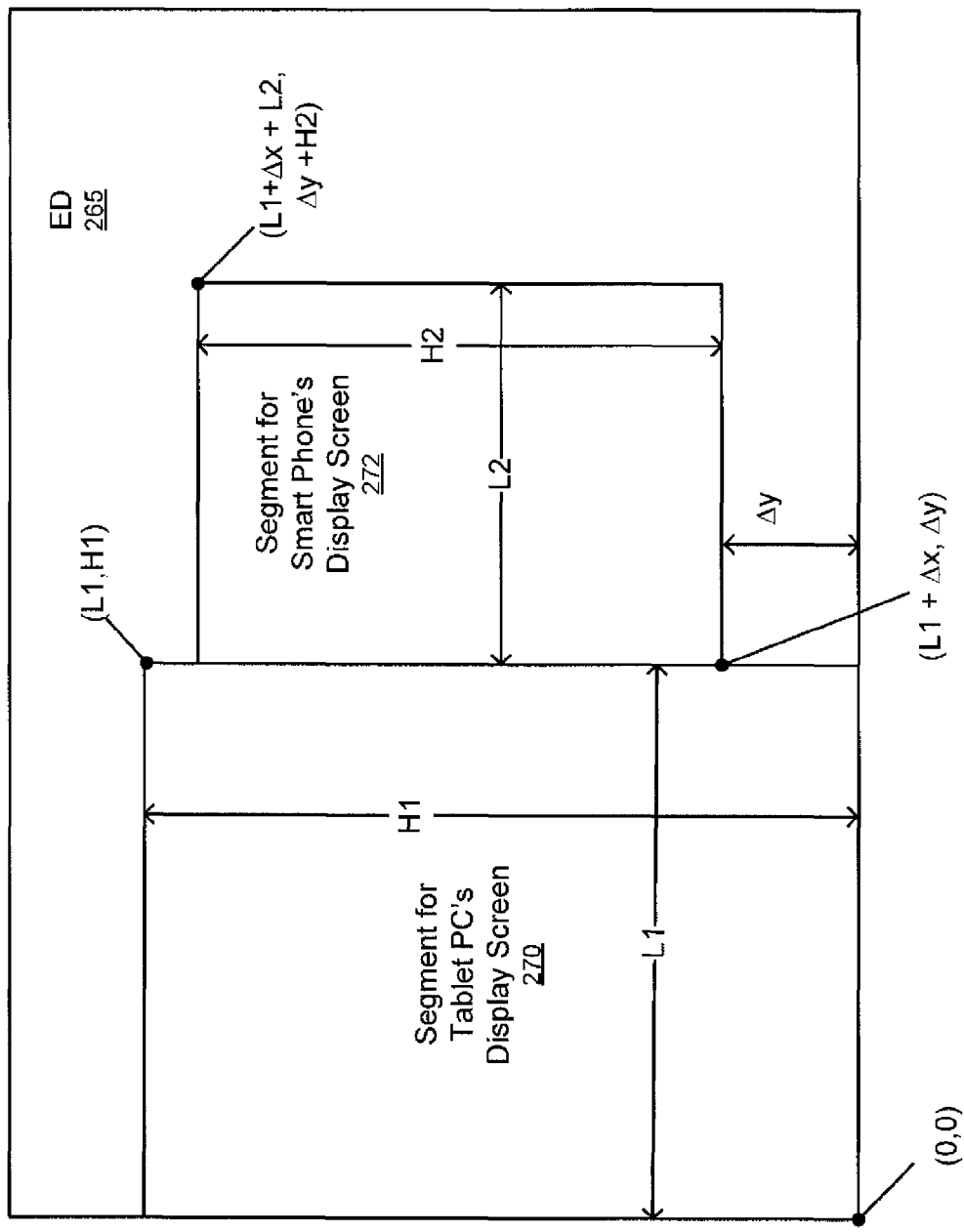

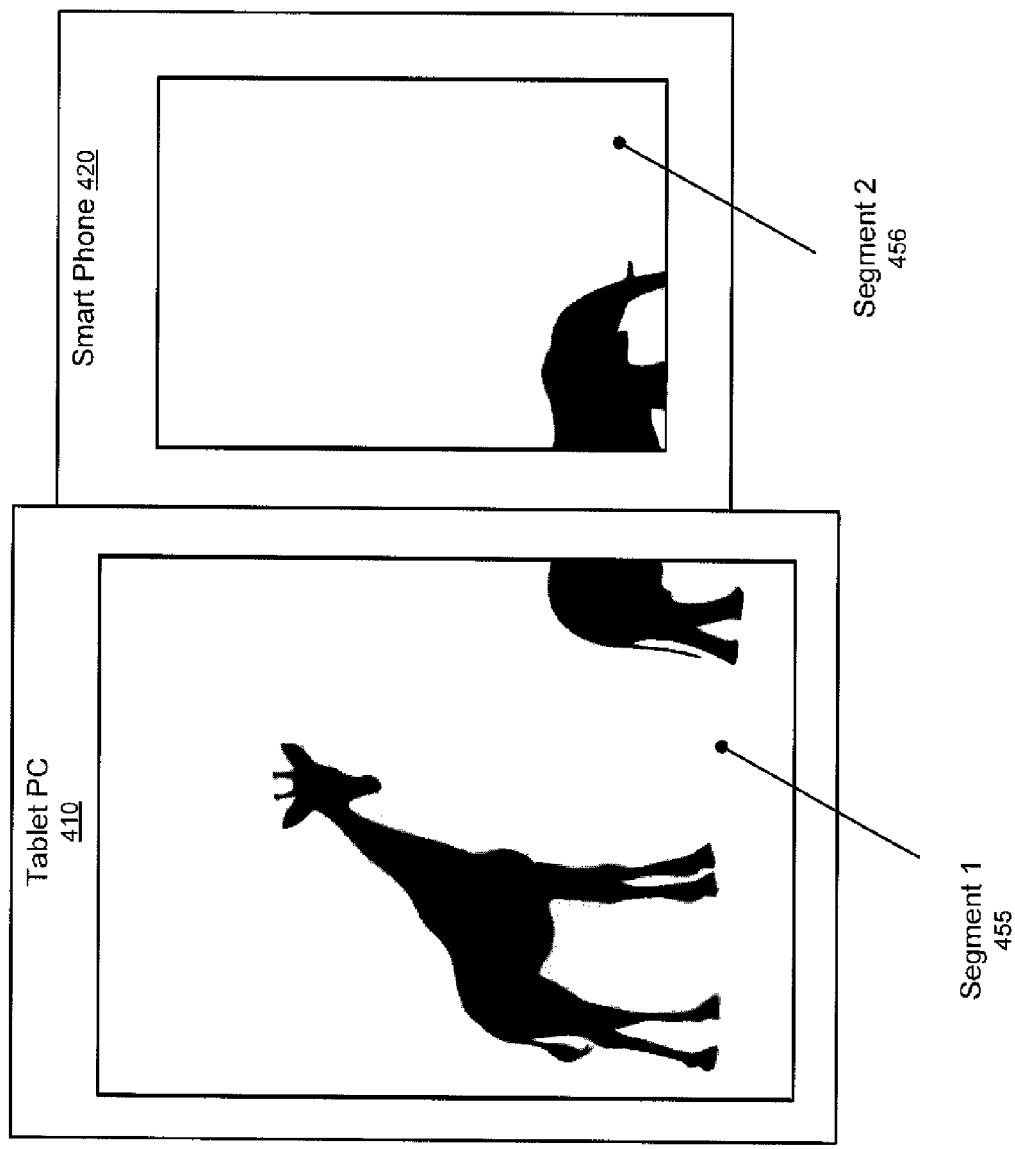

REGISTRATION OF ELECTRONIC DISPLAYS

BACKGROUND

Mobile computing devices with touch-sensitive screens (i.e., a touchscreen) have become nearly ubiquitous thanks to their processing power, portability, and multi-faceted capabilities. In fact, multiple mobile computing devices are often available for use simultaneously. For instance, it is not uncommon for an individual to have both a tablet personal computer (PC) and a smart phone available. It is also common for multiple individuals in a group to each have one or more mobile computing devices.

Although the touchscreens of mobile computing devices have improved in resolution and new generations of mobile computing devices often have larger touchscreens than their ancestors, it is still difficult for a user to view a large electronic document (ED) on a single mobile computing device. For example, the ED may exceed the width of the touchscreen and thus the user may need to use a scrolling function and/or zooming function to view more of the ED. This can be frustrating to the user and may diminish the overall viewing experience. Regardless, users still wish to access and view large EDs on mobile computing devices.

SUMMARY

In general, in one aspect, the invention relates to a method for operating computing devices (CDs) to display an electronic document (ED). The method comprises: obtaining, by a first CD comprising a first touchscreen, a first plurality of screen coordinates associated with a first portion of a first gesture performed by a user; obtaining, by the first CD and from a second CD comprising a second touchscreen, a second plurality of screen coordinates associated with a second portion of the first gesture performed by the user; determining, by the first CD and based on the first plurality of screen coordinates and the second plurality of screen coordinates, an alignment of the first touchscreen and the second touchscreen; and displaying, by the first CD and based on the alignment, a first segment of the ED on the first touchscreen, wherein the second CD displays a second segment of the ED on the second touchscreen while the first segment is displayed.

In general, in one aspect, the invention relates to a non-transitory computer readable medium (CRM) storing instructions for operating computing devices (CDs) to display an electronic document (ED). The instructions comprise functionality for: obtaining, by a first CD comprising a first touchscreen, a first plurality of screen coordinates associated with a first portion of a first gesture performed by a user; obtaining, by the first CD and from a second CD comprising a second touchscreen, a second plurality of screen coordinates associated with a second portion of the first gesture performed by the user; determining, by the first CD and based on the first plurality of screen coordinates and the second plurality of screen coordinates, an alignment of the first touchscreen and the second touchscreen; and displaying, by the first CD and based on the alignment, a first segment of the ED on the first touchscreen, wherein the second CD displays a second segment of the ED on the second touchscreen while the first segment is displayed.

In general, in one aspect, the invention relates to a system for operating computer devices (CDs) to display an electronic document (ED). The system comprises: a first touchscreen associated with a first CD; a computer processor associated with the first CD; an initialization engine associated with the first CD and configured to: obtain a first plurality of screen coordinates associated with a first portion of a gesture performed by a user; and obtain, from a second CD comprising a second touchscreen, a second plurality of screen coordinates associated with a second portion of the gesture performed by the user; an alignment engine executing on the computer processor and configured to determine an alignment of the first touchscreen and the second touchscreen based on the first plurality of screen coordinates and the second plurality of screen coordinates; and a display engine associated with the first CD and configured to display, based on the alignment, a first segment of the ED on the first touchscreen, wherein the second CD displays a second segment of the ED on the second touchscreen while the first segment is displayed.

Other aspects of the invention will be apparent from the following description and the appended claims.

BRIEF DESCRIPTION OF DRAWINGS

FIG. 2A, FIG. 2B, FIG. 2C, and FIG. 2D show examples in accordance with one or more embodiments of the invention.

FIG. 4A, FIG. 4B, and FIG. 4C show examples in accordance with one or more embodiments of the invention.

DETAILED DESCRIPTION

Figure 1:
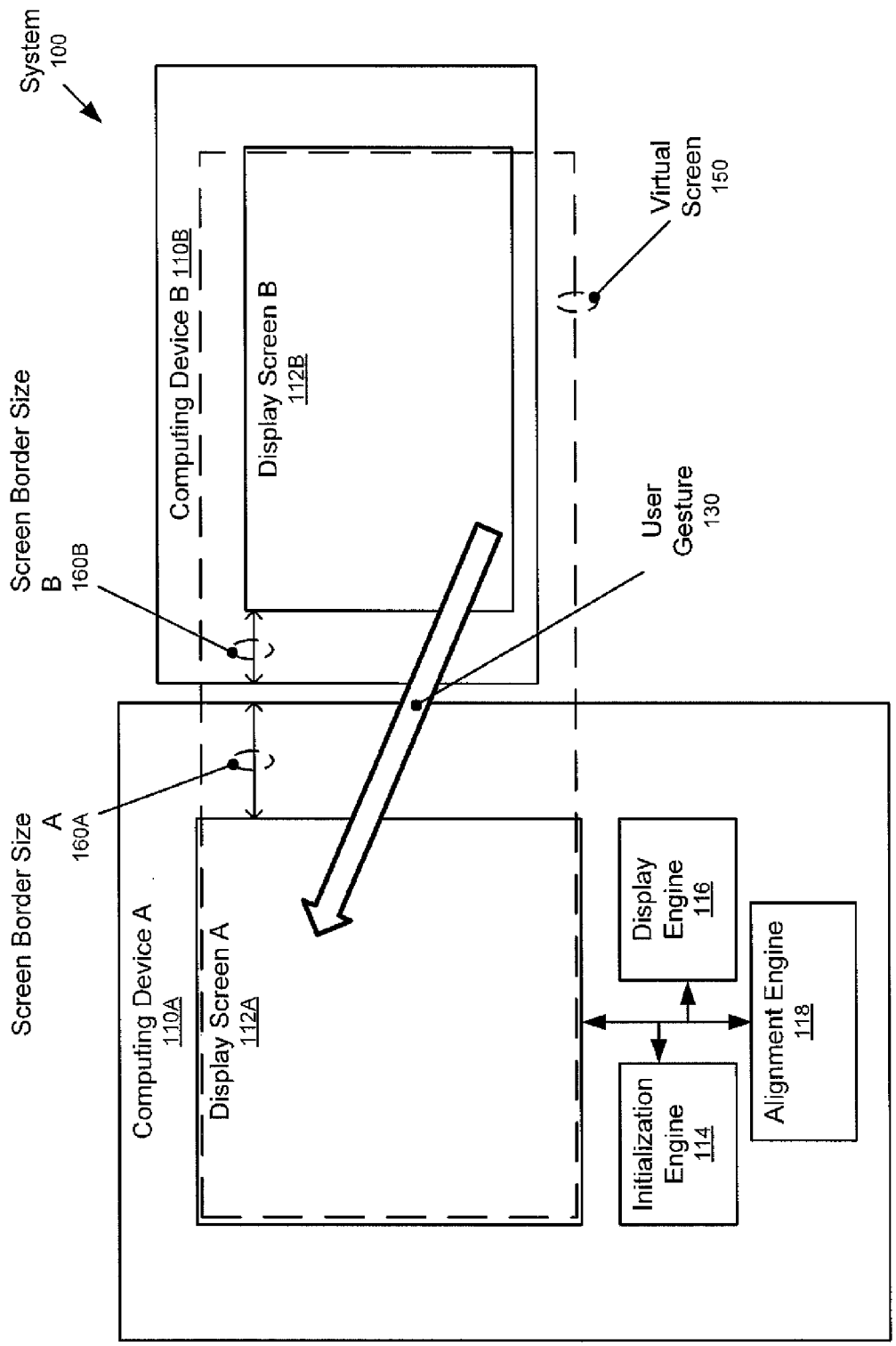
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium for operating multiple computing devices to display an ED (e.g., a spreadsheet, a presentation slide, a photograph, an image, a webpage, an OOXML file, a PDF file, etc.). Specifically, when two or more computing devices that have touchscreens are placed in the same vicinity (e.g., each computing device abuts at least one other computing device), a user may perform a gesture that spans the multiple touchscreens. For example, the user may perform a finger swipe that starts on one display screen and ends on a different touchscreen.

Each computing device may broadcast its screen coordinates that were in contact with the user during the gesture. Each computing device may also broadcast one or more timestamps indicating when the user started making contact with its touchscreen and when the user ended contact with its touchscreen. This broadcasted data may be used to determine the alignment of the display screens. For example, this broadcasted data may be used to determine the relative positioning of the touchscreens within a large virtual screen that intersects all of the touchscreens of the multiple computing devices. Based on at least this determined alignment and the dimensions of the touchscreens, different segments of a large ED may selected for display, with each computing device displaying one of the segments.

FIG. 1 shows a system (100) in accordance with one or more embodiments of the invention. As shown in FIG. 1, the system (100) includes at least two computing devices: computing device A (110A) and computing device B (110B). One or more users have positioned the multiple computing devices (110A, 110B) as shown in FIG. 1. Each computing device (110A, 110B) may be a mobile computing device (e.g., a laptop, a smart phone, a PC tablet, a personal digital assistant (PDA), etc.). Further, each computing device (110A, 110B) includes a touchscreen. Specifically, computing device A (110A) includes display screen A (112A), while computing device B (110B) includes display screen B (112B). Both display screen A (112A) and display screen B (112B) are touchscreens.

In one or more embodiments, all display screens (112A, 112B) may be the same size. Alternatively, different computing devices (110A, 110B) may have display screens of different sizes. As also shown in FIG. 1, each display screen (112A, 112B) is separated from the edge of its computing device by a screen border. Different computing devices (110A, 110B) may have the same or different screen border sizes. For example, computing device A (110A) has screen border size A (160A), while computing device B (110B) has screen border size B (160B).

In one or more embodiments of the invention, computing device A (110A) has multiple components including an initialization engine (114), an alignment engine (118), and a display engine (116). Each of these components is discussed below. Moreover, each of these components may correspond to any combination of hardware and software.

In one or more embodiments of the invention, computing device A (110A) includes the initialization engine (114). The initialization engine (114) is configured to discover other computing devices (e.g., computing device B (110B)) within the vicinity of computing device A (110A). For example, the initialization engine (114) may periodically broadcast discovery messages. In response to the discovery message, another computing device (e.g., computing device B (110B)) may send its make, model, display screen dimensions, screen border size, etc. to computing device A (110A). In one or more embodiments of the invention, the other computing device only sends its make and model. In such embodiments, computing device A (110A) may determine the display screen size, screen border size, etc. by accessing a data structure (e.g., lookup table, database, etc.) on computing device A (110A) using the make and model as a search key(s). Additionally or alternatively, computing device A (110A) may access a website storing the display screen size, the screen border size, etc. of commercially available computing devices (e.g., computing device B (110B)).

In one or more embodiments of the invention, the initialization engine (114) is configured to prompt the user to make the gesture (130) spanning multiple display screens (112A, 112B). The prompt may be visual or audio. The prompt may request that the user gesture (130) be made with a finger or a pointing device (e.g., stylus). The prompt may request that the user gesture (130) be approximately linear and of approximately constant velocity. For example, the user gesture (130) may be a finger swipe.

In one or more embodiments of the invention, the initialization engine (114) is configured to set up a reference clock that is shared with all discovered computing devices. This shared reference clock may be used by each of the computing devices (110A, 110B) to generate timestamps associated with the user gesture (130). For example, the initialization engine (114) may be configured to generate a timestamp when the user gesture (130) makes contact with display screen A (112A) and/or when the user gesture (130) stops making contact with display screen A (112A). The initialization engine (114) may obtain similar timestamps (i.e., timestamps generated in response to similar triggers) from the other computing devices (e.g., computing device B (110B)) in the system (100). Those skilled in the art, having the benefit of this detailed description, will appreciate that if all timestamps are generated according to the same reference clock, differences between the timestamps are meaningful (discussed below).

In one or more embodiments of the invention, the initialization engine (114) is configured to obtain screen coordinates associated with the user gesture (130). Specifically, during the user gesture (130), the user makes contact with display screen A (112A). Each point of contact between the user and display screen A (112A) may be referenced using an ordered pair (x, y). This ordered pair may be referred to as a screen coordinate. During different portions of the user gesture (130), the user makes contact with different display screens (112A, 112B). The initialization engine (114) may obtain multiple screen coordinates from other computing devices (e.g., computing device B (110B)) corresponding to the different portions of the user gesture (130).

In one or more embodiments of the invention, computing device A (110A) includes an alignment engine (118). The alignment engine (118) is configured to determine an alignment of the multiple display screens (112A, 112B). For example, the alignment may be the relative positioning (i.e., differences in positions along one or more axis) of the display screens (112A, 112B) within a virtual screen (150). The virtual screen (150) is a large screen that intersects the display screens (112A, 112B) in the system (100). In other words, the virtual screen (150) may be considered an aggregation of the display screens (112A, 112B) in the system (100). As shown in FIG. 1, the virtual screen (150) overlaps all of display screen A (112A) and all of display screen B (112B). In one or more embodiments of the invention, the virtual screen (150) includes regions that do not overlap any display screen. For example, virtual screen (150) may overlap the screen borders. In one or more embodiments of the invention, the virtual screen (150) only includes regions that overlap at least one display screen. In such embodiments, the virtual screen (150) does not include screen borders and the virtual screen (150) is split across the two display screens (112A, 112B).

In one or more embodiments of the invention, the alignment engine (118) is configured to calculate the position of display screen A (112A) within the virtual screen (150). The alignment engine (118) may also be configured to calculate the position of the other display screens (e.g., display screen B (112B)) within the virtual screen (150). These calculations may be based on the dimensions of the displays screens (112A, 112B), the screen coordinates (discussed above) associated with the user gesture (130), the screen border sizes (160A, 160B), and/or the timestamps.

Figure 2A:
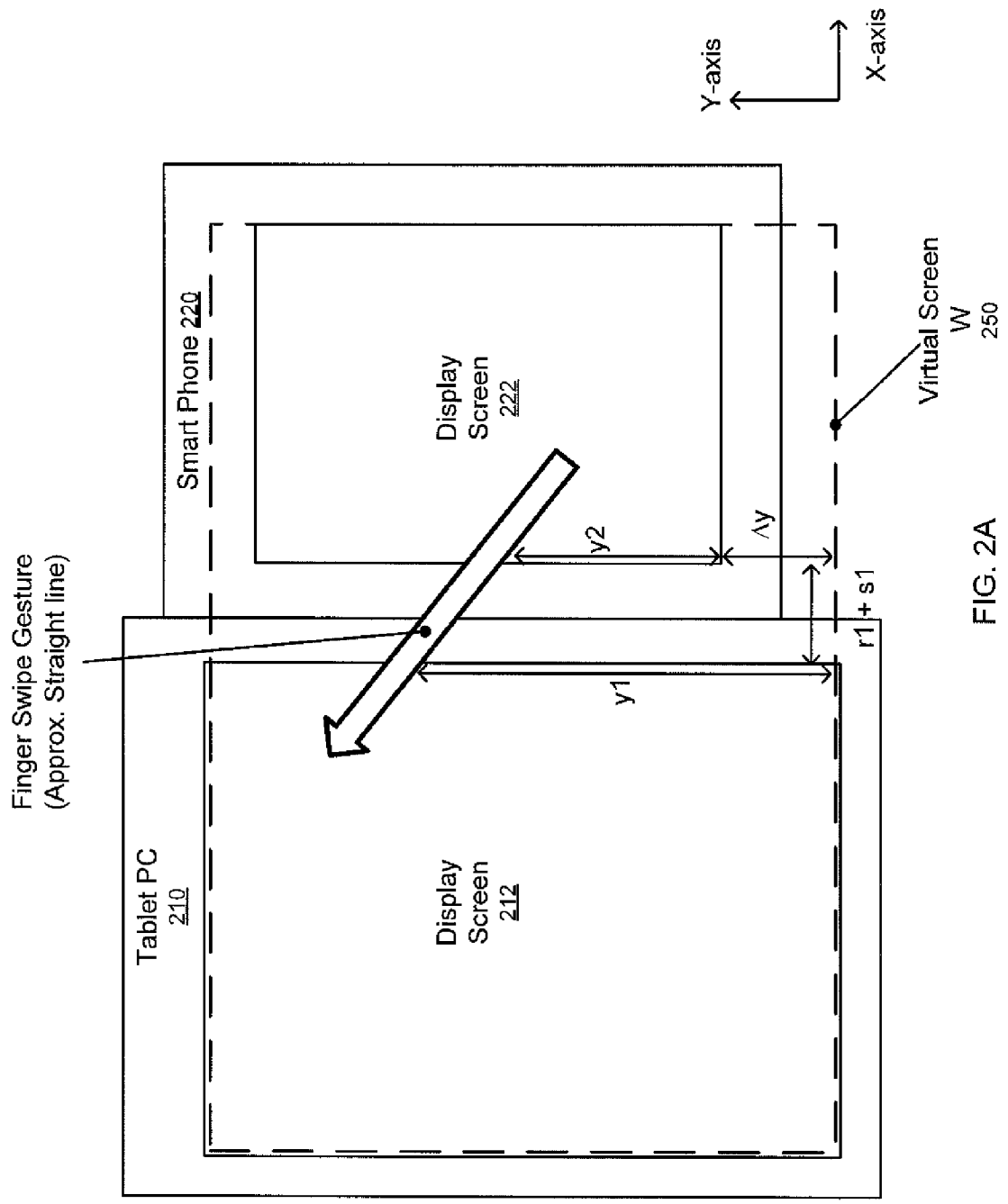

FIG. 2A shows an example in accordance with one or more embodiments of the invention. Specifically, the example in FIG. 2A is for determining the alignment of the display screens (212, 222) within virtual screen W (250). As shown in FIG. 2, a tablet PC (210) and a smart phone (220) are positioned adjacent to each other. In this example, the tablet PC (210) and the smart phone (220) correspond to computing device A (110A) and computing device B (110B), respectively. The tablet PC (210) includes a display screen (212) and the smart phone (220) includes a display screen (222). The two display screens (212, 222) are of different sizes. The inter-screen distance (i.e., the sum of the screen border sizes) is r1+s1. As also shown in FIG. 2A, virtual screen W (250) includes screen borders and other regions that do not overlap the display screens (212, 222).

Assume the user's gesture is a finger swipe. During one portion of the finger swipe, the user is in contact with display screen (222). During another portion of the finger swipe, the user is in contact with display screen (212). Accordingly, there exists multiple screen coordinates from display device (212) and display device (222) corresponding to different portions of the finger swipe. The values of y1 and y2 are found within the screen coordinates. These multiple screen coordinates may be fit to a straight line having an unsigned slope of m. In one or more embodiments of the invention, based on geometry, the relative positions of the two display screens along the y axis (i.e., $\Delta y$) of virtual screen W (250) may be calculated as:

$$\Delta y = y1 - y2 - m(r1+s1).$$

Additionally or alternatively, if the swipe speed is v and the inter-screen time (i.e., the time between the swipe gesture leaving display screen (222) and entering display screen (212), as calculated from the timestamps) is t, then the directed distance along the swipe gesture between the two display screens (212, 222) is v/t. In this case, $\Delta y$ may be calculated as:

$$\Delta y = y1 - y2 - (v/t)\sin(\tan^{-1}(m)).$$

Those skilled in the art, having the benefit of this detailed description, will appreciate that the last calculation for $\Delta y$ does not require the inter-screen distance (i.e., the sum of the screen border sizes). Moreover, those skilled in the art, having the benefit of this detailed description, will also appreciate that the relative positions of the two display screens along the x-axis (i.e., $\Delta x$) of virtual screen W (250) is $\Delta x = (r1+s1)$.

Figure 2B:
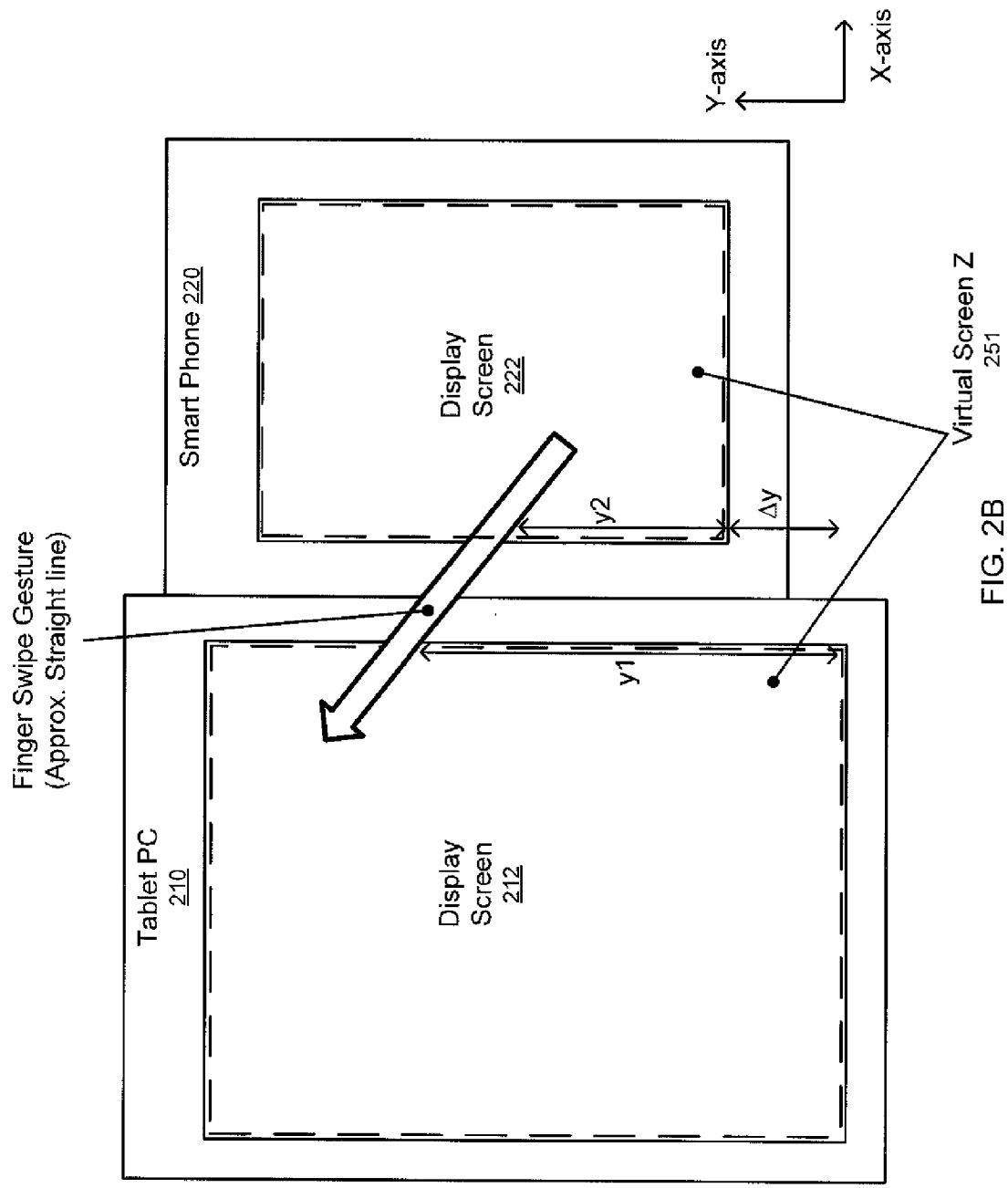

FIG. 2B shows an example in accordance with one or more embodiments of the invention. Specifically, the example in FIG. 2B is for determining the alignment of the display screens (212, 222) within virtual screen Z (251). Unlike virtual screen W (250), virtual screen Z (251) only includes the displays screens (212, 222). In other words, virtual screen Z (251) does not include, for example, the screen borders.

In FIG. 2B, the relative positions of the two display screens (212, 222) along the y-axis (i.e., $\Delta y$) of virtual screen Z (251) is the same as measured above in FIG. 2A. However, the relative positions of the two display screens (212, 222) along the x-axis ($\Delta x$) of virtual screen Z (251) is $\Delta x = 0$, because the virtual screen Z (251) does not include the screen borders.

Referring back to FIG. 1, in one or more embodiments of the invention, computing device A (110A) includes a display engine (116). The display engine (116) is configured to select a segment of the ED to display on display screen A (112A) based on the dimensions of display screen A (112A), the dimensions of display screen B (112B), and the relative positioning of display screen A (112A) and display screen B (112B) within the virtual screen (150). The display engine (116) may also be configured to select a segment of the ED to display on display screen B (112B) based on the dimensions of display screen A (112A), the dimensions of display screen B (112B), and the relative positioning of display screen A (112A) and display screen B (112B) within the virtual screen (150).

Figure 2C:
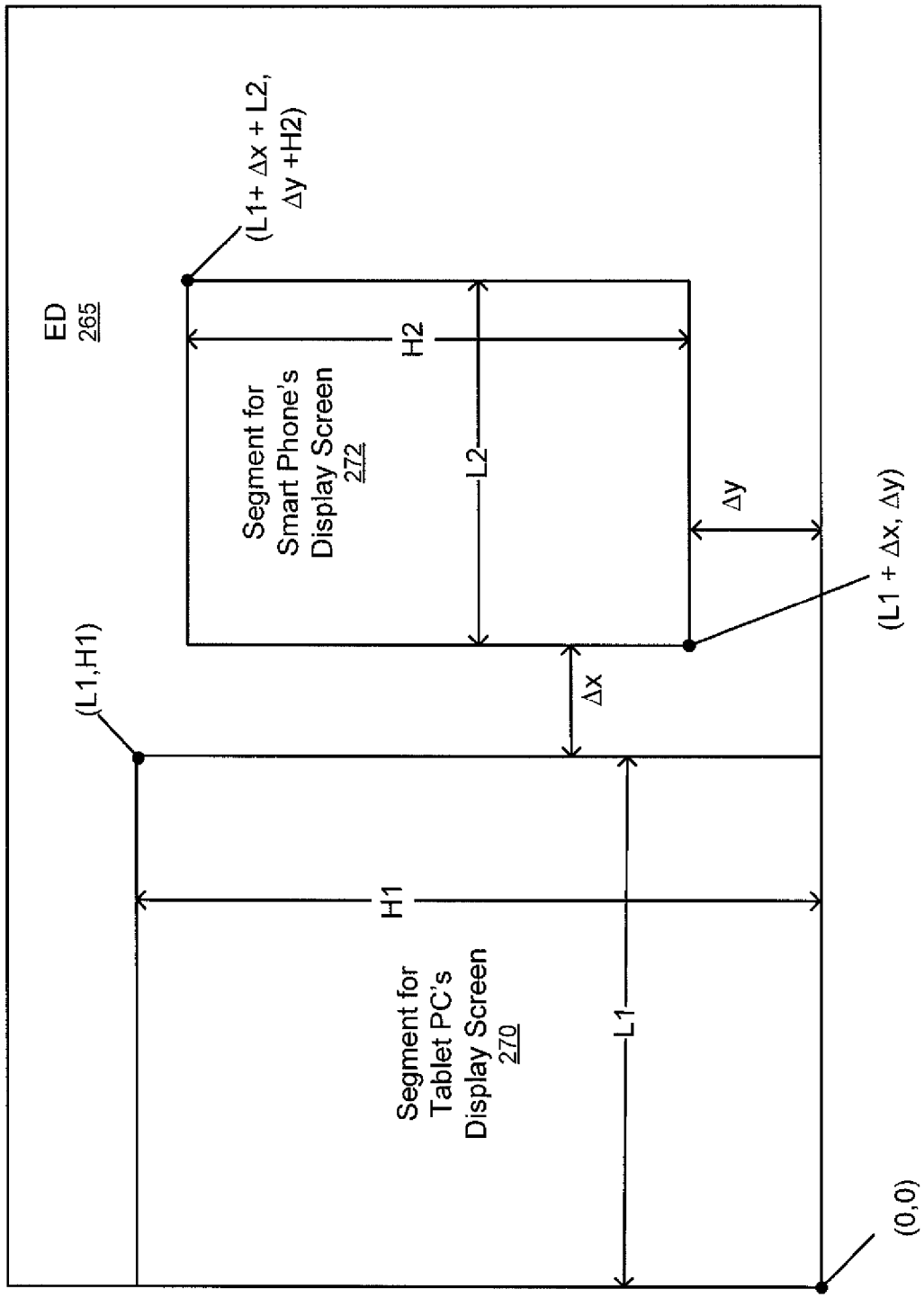

FIG. 2C shows an example in accordance with one or more embodiments of the invention. FIG. 2C should be considered in view of FIG. 2A. Specifically, the example in FIG. 2C is for selecting (e.g., by the display engine (116)) segments of an ED (265) for display on the tablet PC (210) and the smart phone (220), discussed above in reference to FIG. 2A. Let the display screen of the tablet PC (210) have a length of L1 and a height of H1. Let the display screen of the smart phone (220) have a length of L2 and a height of H2. The dimensions of the tablet PC's segment (270) (i.e., L1×H1) match the dimensions of the tablet PC's display screen. Similarly, the dimensions of the smart phone's segment (272) (i.e., L2×H2) match the dimensions of the smart phone's display screen. As shown in FIG. 2C, the location of the smart phone's segment (272) within the ED (265) is dependent on the calculated $\Delta y$ and $\Delta x$. In other words, the alignment of the smart phone and the tablet PC within virtual screen W (250) is used to select the segment (272).

FIG. 2D shows an example in accordance with one or more embodiments of the invention. FIG. 2D should be considered in view of FIG. 2B. Specifically, the example in FIG. 2D is for selecting (e.g., by the display engine (116)) segments of an ED (265) for display on the tablet PC (210) and the smart phone (220), discussed above in reference to FIG. 2B. Like before, let the display screen of the tablet PC (210) have a length of L1 and a height of H1. Let the display screen of the smart phone (220) have a length of L2 and a height of H2. The dimensions of the tablet PC's segment (270) (i.e., L1×H1) match the dimensions of the tablet PC's display screen. Similarly, the dimensions of the smart phone's segment (272) (i.e., L2×H2) match the dimensions of the smart phone's display screen. As shown in FIG. 2D, the location of the smart phone's segment (272) within the ED (265) is dependent on the calculated $\Delta y$ and $\Delta x$ ($\Delta x = 0$). In other words, the alignment of the smart phone and the tablet PC within virtual screen Z (251) is used to select the segment (272).

Although in FIG. 1 only computing device A (110A) has the initialization engine (114), the alignment engine (118), and the display engine (116), in other embodiments of the invention, all computing devices have an initialization engine, an alignment engine, and a display engine. In such embodiments, each computing device (110A, 110B) may be responsible for calculating its own relative position within the virtual screen (150). Further, each computing device (110A, 110B) may be responsible for selecting its own segment of the ED for display. Additionally or alternatively, one of the multiple computing devices may be responsible for calculating all relative positions and selecting all segments, and then sending each segment (or the entire ED) to the appropriate computing device for display. Further still, although only a single user gesture (130) is shown, the user may perform multiple gestures. Each of the gestures may be used to refine the determined alignment (i.e., relative positioning) of the display screens (112A, 112B) within the virtual screen (150). For example, multiple relative positions for each display screen along each axis may be averaged.

Figure 3:
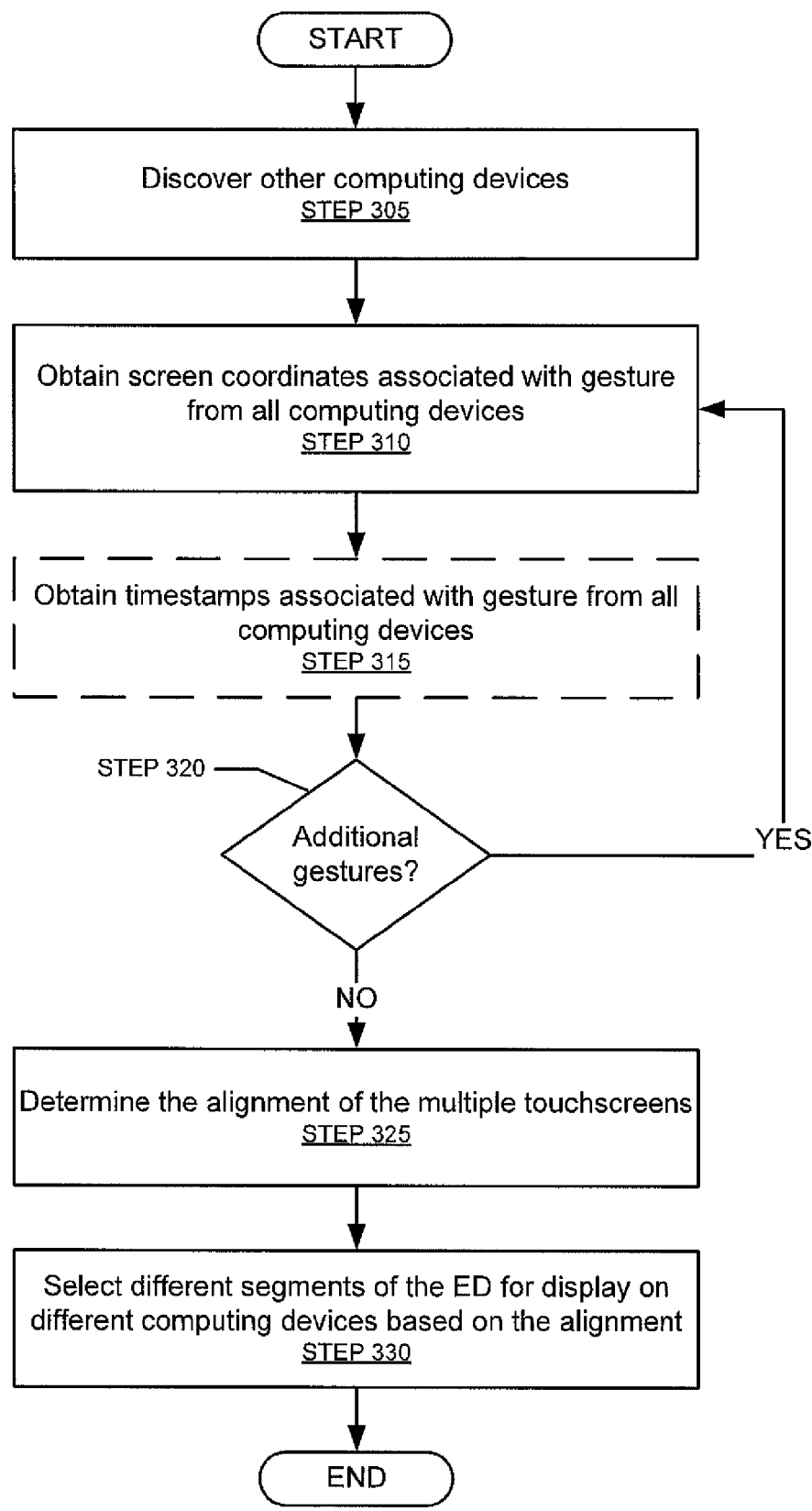
FIG. 3 shows a flowchart in accordance with one or more embodiments of the invention.

FIG. 3 shows a flowchart in accordance with one or more embodiments of the invention. The flowchart depicts a process for operating multiple computing devices to display an ED. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, computing devices are discovered (Step 305). These computing devices may be mobile computing devices. Each of these computing devices has a touchscreen. One computing device (e.g., computing device A (110A)) may broadcast discovery messages. Other computing devices within the vicinity may respond to the broadcast discovery message. The response may include the make and model of the computing device, the dimensions of its display screen, its screen border size, etc. A shared reference clock may be established among the discovered computing devices.

In Step 310, screen coordinates associated with a user gesture are obtained from all computing devices. The user may be prompted to perform a gesture (e.g., finger swipe) spanning multiple display screens. Accordingly, during different portions of the gesture, the user may be in contact with different touchscreens. Contact between a touchscreen and the user is recorded as a set of screen coordinates. Accordingly, each of the computing devices has a set of screen coordinates, and each set corresponds to different portions of the user's gesture.

In Step 315, timestamps associated with the gesture are obtained from all computing devices. Specifically, each computing device may generate timestamps, based on the shared reference clock, when the gesture starts making contact with the computing device's touchscreen and when the gesture stops making contact with the computing device's touchscreen. In one or more embodiments, Step 315 is optional.

In Step 320, it is determined whether the user wishes to perform additional gestures. As discussed above, multiple gestures may be used to refine the determined alignment (i.e., relative positioning) of the multiple touchscreens. The user may specify the number of gestures in advance. When it is determined that the user wishes to perform more gestures, the process returns to Step 310. Otherwise, the process proceeds to Step 325.

In Step 325, the alignment (e.g., relative positioning) of the display screens within a virtual screen are determined. A virtual screen is a large screen that intersects all the touchscreens in the system. In other words, the virtual screen may be considered an aggregation of the touchscreens. The virtual screen might or might not include screen borders and other regions that do not overlap with a touchscreen. FIG. 2A, discussed above, shows an example for determining the alignment of the touchscreens within a virtual screen that includes more than just the touchscreens. FIG. 2B, discussed above, shows an example for determining the alignment of the touchscreens within a virtual screen that includes only the touchscreens.

In Step 330, different segments of the ED are selected for display by the computing devices. As discussed in reference to FIGS. 2C and 2D, these different segments are selected based on the alignment (i.e., relative positions) of the touchscreens within the virtual screen and the dimensions of the touchscreens. Each computing device may simultaneously display one of the segments. The segments may be non-overlapping.

Although FIG. 3 only shows a single iteration of the process, those skilled in the art, having the benefit of this detailed description, will appreciate that the process depicted in FIG. 3 may be repeated multiple times. For example, each time the user moves (i.e., repositions or relocates) one or more of the computing devices, the process in FIG. 3 may be repeated. Similarly, each time the user introduces another computing device or removes a computing device, the process in FIG. 3 may be repeated.

Figure 4A:
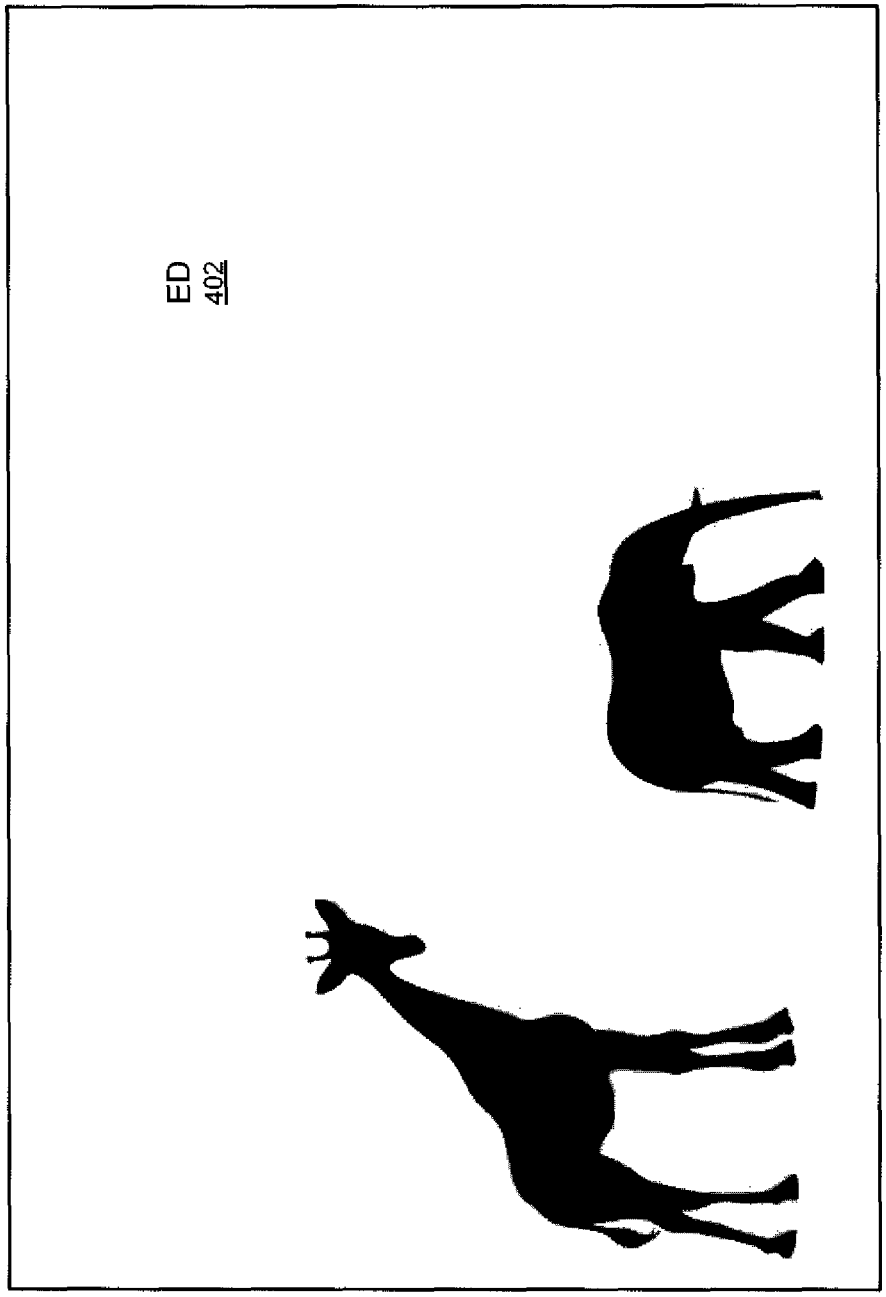
Figure 4B:
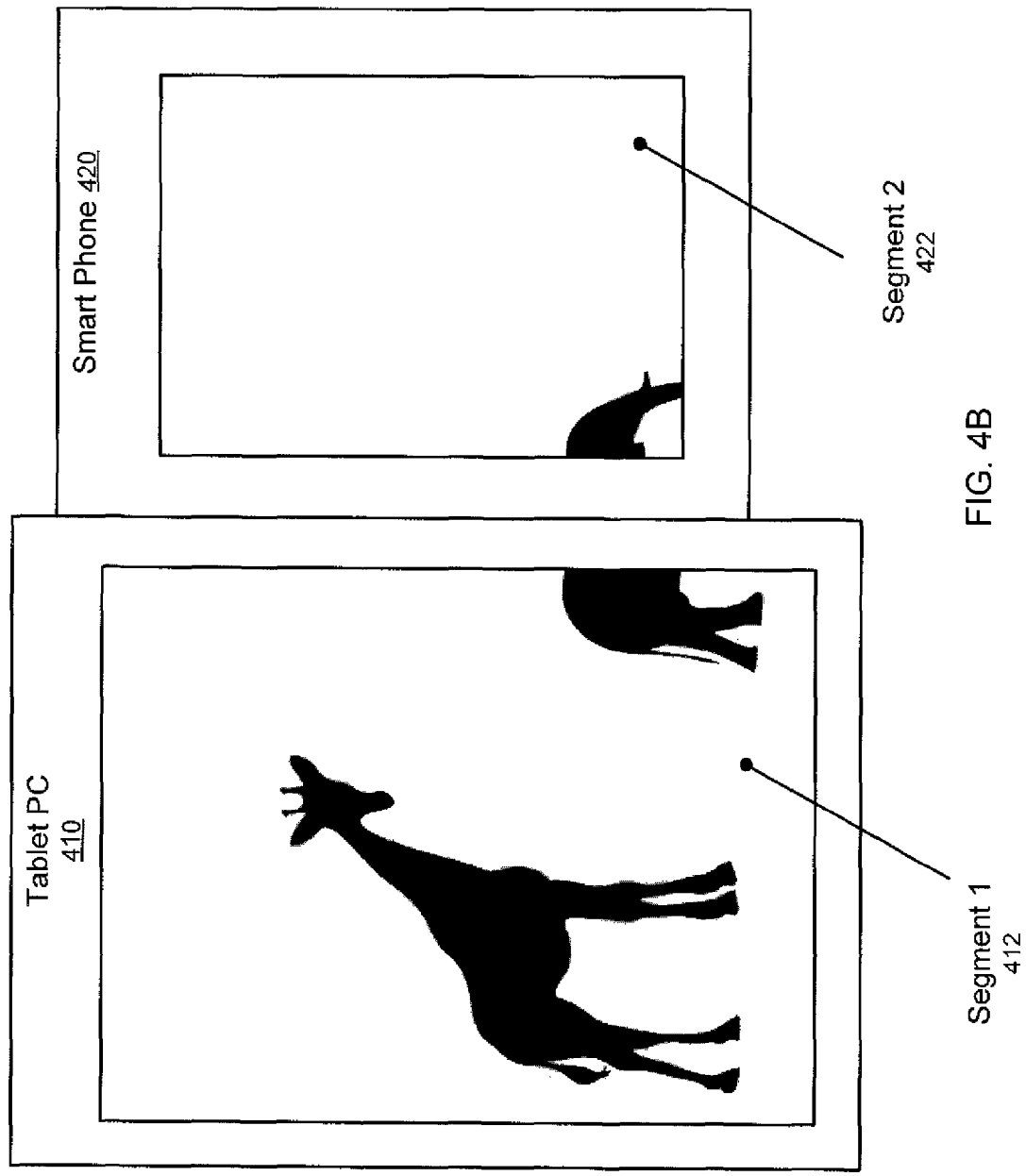

FIG. 4A, FIG. 4B, and FIG. 4C show an example in accordance with one or more embodiments of the invention. As shown in FIG. 4A, assume there exists a large ED (402). One or more users wish to display the ED (402) on a tablet PC (410). However, the width of the ED (402) greatly exceeds the width of tablet PC's touchscreen. The one or more users are also in possession of a smart phone (420) that has a touchscreen of a different size. The one or more users place the tablet PC (410) and the smart phone (420) adjacent to each other (similar to FIG. 2A and FIG. 2B). One of the users performs a finger swipe that starts on the touchscreen of the mobile phone and ends on the touchscreen the tablet PC. Based on the screen coordinates resulting from the finger swipe, the alignment of the tablet PC (410) and the smart phone (420) within a virtual screen is determined. Moreover, non-overlapping segments of the ED (402) are selected based on the alignment and the dimensions of the touchscreens.

FIG. 4B shows the resulting segments (i.e., segment 1 (412), segment 2 (422)) if the virtual screen includes more than just the touchscreens. Specifically, FIG. 4B shows the resulting segments (412, 422) if the virtual screen resembles virtual screen W (250), discussed above in reference to FIG. 2A, and the segments are selected as shown in FIG. 2C. As shown in FIG. 4B, the tablet PC (410) displays segment 1 (412) of the ED (402), while the smart phone displayed segment 2 (422) of the ED (402). Segment 1 (412) and segment 2 (422) are non-overlapping segments of the ED (402). These two segments (412, 422) permit the user(s) to see more than would be possible with just a single mobile device. However, the strip of ED (402) that exists between segment 1 (412) and segment 2 (422) is not visible.

FIG. 4C shows the resulting segments (i.e., segment 1 (455), segment 2 (456)) if the virtual screen includes only the touchscreens. Specifically, FIG. 4C shows the resulting segments (455, 456) if the virtual screen resembles virtual screen Z (251), discussed above in reference to FIG. 2B, and the segments are selected as shown in FIG. 2D. As shown in FIG. 4C, the tablet PC (410) displays segment 1 (455) of the ED (402), while the smart phone displayed segment 2 (456) of the ED (402). Segment 1 (455) and segment 2 (456) are non-overlapping segments of the ED (402). These two segments (412, 422) permit the user(s) to see more than would be possible with just a single mobile device. Segment 1 (455) is identical to segment 1 (412), discussed above in reference to FIG. 4B. However, segment 2 (456) is not identical to segment 2 (422), discussed above in reference to FIG. 4B, because the virtual screen only includes the touchscreens (i.e., it does not include the screen borders, etc.). Accordingly, unlike in FIG. 4B, there is no invisible strip of the ED (402) between segment 1 (455) and segment 2 (456).

Various embodiments of the invention may have one or more of the following advantages: the ability to display an ED across multiple computing devices; the ability to calculate the relative positions of the computing devices within a virtual screen based on a user gesture spanning the display screens of the computing devices; the ability to use screen border sizes and/or timestamps to calculate the positions; the ability to calculate the multiple positions using multiple gestures; the ability to select segments of the ED for display based on the multiple positions and the dimensions of the display screens; etc.

Figure 5:
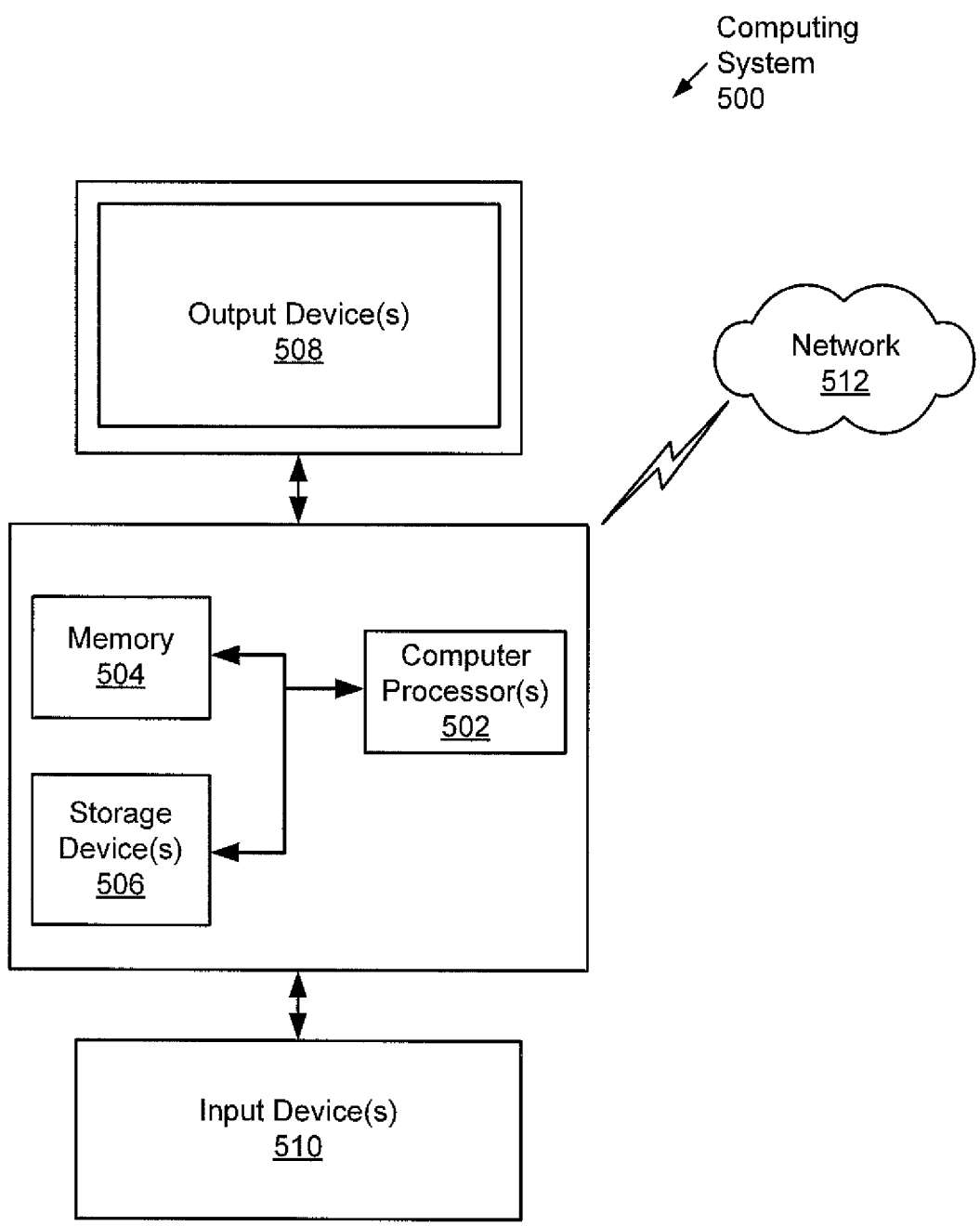
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating computing devices (CDs) to display an electronic document (ED), comprising:
   obtaining, by a first CD comprising a first touchscreen, a first plurality of screen coordinates associated with a first portion of a first gesture performed by a user;
   obtaining, by the first CD and from a second CD comprising a second touchscreen, a second plurality of screen coordinates associated with a second portion of the first gesture performed by the user;
   determining, by the first CD and based on the first plurality of screen coordinates and the second plurality of screen coordinates, an alignment of the first touchscreen and the second touchscreen,
   wherein the second CD is adjacent to the first CD; and
   displaying, by the first CD and based on the alignment, a first segment of the ED on the first touchscreen,
   wherein the second CD displays a second segment of the ED on the second touchscreen while the first segment is displayed, and
   wherein the second segment is offset from the first segment within the ED by an inter-screen distance between the first touchscreen and the second touchscreen,
   wherein determining the alignment comprises:
   fitting the first plurality of screen coordinates and the second plurality of screen coordinates to a line,
   generating, by the first CD, a first timestamp associated with the first portion of the first gesture leaving the first touchscreen;
   obtaining, by the first CD and from the second CD, a second timestamp associated with the first gesture entering the second touchscreen;
   determining an inter-screen time based on the first timestamp and the second timestamp; and
   obtaining a velocity of the first gesture and a slope of the line,
   wherein determining the alignment is further based on the inter-screen time, the velocity, and an arctangent of the slope but not the inter-screen distance, wherein the first gesture is a finger swipe.

2. The method of claim 1, wherein the ED exceeds a width of the first touchscreen, and wherein the ED is at least one selected from a group consisting of a webpage, a spreadsheet, a photograph, and a presentation slide.

3. The method of claim 1, further comprising:
   obtaining, by the first CD, a first screen border size of the first CD; and
   obtaining, by the first CD and from the second CD, a second screen border size of the second CD,
   wherein determining the alignment is further based on the first screen border size and the second screen border size.

4. The method of claim 1, further comprising:
   selecting, by the first CD, the first segment based on the alignment and a plurality of dimensions of the first touchscreen and the second touchscreen; and
   sending, by the first CD, the second segment to the second CD for display.

5. The method of claim 1, further comprising:
   sending, by the first CD, the ED to the second CD, wherein the second CD selects the second segment based on a plurality of dimensions of the second touchscreen.

6. The method of claim 1, further comprising:
obtaining, by the first CD, a third plurality of screen coordinates associated with a second gesture spanning the first touchscreen and the second touchscreen,
wherein determining the alignment is further based on the third plurality of screen coordinates.

7. A non-transitory computer readable medium (CRM) storing instructions for operating computing devices (CDs) to display an electronic document (ED), the instructions comprising functionality for:
obtaining, by a first CD comprising a first touchscreen, a first plurality of screen coordinates associated with a first portion of a first gesture performed by a user;
obtaining, by the first CD and from a second CD comprising a second touchscreen, a second plurality of screen coordinates associated with a second portion of the first gesture performed by the user;
determining, by the first CD and based on the first plurality of screen coordinates and the second plurality of screen coordinates, an alignment of the first touchscreen and the second touchscreen, wherein the second CD is adjacent to the first CD; and
displaying, by the first CD and based on the alignment, a first segment of the ED on the first touchscreen,
wherein the second CD displays a second segment of the ED on the second touchscreen while the first segment is displayed, and
wherein the second segment is offset from the first segment within the ED by an inter-screen distance between the first touchscreen and the second touchscreen,
wherein the instructions for determining the alignment comprise functionality for:
fitting the first plurality of screen coordinates and the second plurality of screen coordinates to a line,
generating, by the first CD, a first timestamp associated with the first gesture leaving the first touchscreen;
obtaining, by the first CD and from the second CD, a second timestamp associated with the first gesture entering the second touchscreen;
determining an inter-screen time based on the first timestamp and the second timestamp; and
obtaining a velocity of the first gesture and a slope of the line,
wherein determining the alignment is further based on the inter-screen time, the velocity, and an arctangent of the slope but not the inter-screen distance, wherein the first gesture is a finger swipe.

8. The non-transitory CRM of claim 7, the instructions further comprising functionality for:
obtaining, by the first CD, a first screen border size of the first CD; and
obtaining, by the first CD and from the second CD, a second screen border size of the second CD,
wherein determining the alignment is further based on the first screen border size and the second screen border size.

9. The non-transitory CRM of claim 7, the instructions further comprising functionality for:
selecting, by the first CD, the first segment and the second segment based on the alignment and a plurality of dimensions of the first touchscreen and the second touchscreen; and
sending, by the first CD, the second segment to the second CD for display.

10. The non-transitory CRM of claim 7, the instructions further comprising functionality for:
sending, by the first CD, the ED to the second CD,
wherein the second CD selects the second segment based on a plurality of dimensions of the second touchscreen.

11. The non-transitory CRM of claim 7, the instructions further comprising functionality for:
obtaining, by the first CD, a third plurality of screen coordinates associated with a second gesture spanning the first touchscreen and the second touchscreen,
wherein determining the alignment is further based on the third plurality of screen coordinates.

12. A system for operating computer devices (CDs) to display an electronic document (ED), comprising:
a first touchscreen associated with a first CD;
a computer processor associated with the first CD;
an initialization engine associated with the first CD that:
obtains a first plurality of screen coordinates associated with a first portion of a gesture performed by a user; and
obtains, from a second CD comprising a second touchscreen, a second plurality of screen coordinates associated with a second portion of the gesture performed by the user;
an alignment engine executing on the computer processor that determines an alignment of the first touchscreen and the second touchscreen based on the first plurality of screen coordinates and the second plurality of screen coordinates, wherein the second CD is adjacent to the first CD; and
a display engine associated with the first CD that displays, based on the alignment, a first segment of the ED on the first touchscreen,
wherein the second CD displays a second segment of the ED on the second touchscreen while the first segment is displayed, and
wherein the second segment is offset from the first segment within the ED by an inter-screen distance between the first touchscreen and the second touchscreen,
wherein:
the alignment is determined by at least fitting the first plurality of screen coordinates and the second plurality of screen coordinates to a line;
the ED exceeds a width of the first touchscreen; and
the ED is at least one selected from a group consisting of a webpage, a spreadsheet, a photograph, and a presentation slide,
wherein the initialization engine also:
generates a first timestamp associated with the gesture leaving the first touchscreen;
obtains a second timestamp generated by the second CD and associated with the gesture entering the second touchscreen;
determines an inter-screen time based on the first timestamp and the second timestamp; and
obtains a velocity of the gesture and a slope of the line,
wherein the alignment is further determined based on the inter-screen time, the velocity and an arctangent of the slope but not the inter-screen distance, the gesture is a finger swipe.

13. The system of claim 12, wherein the display engine also:
selects the first segment and the second segment based on the alignment and a plurality of dimensions of the first touchscreen and the second touchscreen; and
sends the second segment to the second CD for display.

14. A method for operating computing devices (CDs) to display an electronic document (ED), comprising:
- obtaining, by a first CD comprising a first touchscreen, a first plurality of screen coordinates associated with a gesture performed by a user and a first timestamp associated with the gesture leaving the first touchscreen;
- obtaining, by the first CD and from a second CD comprising a second touchscreen, a second plurality of screen coordinates associated with the gesture and a second timestamp associated with the gesture entering the second touchscreen,
- wherein the first touchscreen and the second touchscreen are separated by an inter-screen distance, and
- wherein the second CD is adjacent to the first CD;
- fitting the first plurality of screen coordinates and the second plurality of screen coordinates to a line;
- determining a velocity of the gesture and a slope of the line;
- determining an inter-screen time based on the first timestamp and the second timestamp;
- determining, by the first CD, an alignment of the first touchscreen and the second touchscreen based on the first and second plurality of screen coordinates, the inter-screen time, the velocity, and an arctangent of the slope but not the inter-screen distance; and
- displaying, by the first CD and based on the alignment, a first segment of the ED on the first touchscreen,
- wherein the second CD displays a second segment of the ED on the second touchscreen while the first segment is displayed.

* * * * *